G. BIRD.
SPRING WHEEL FOR ROAD VEHICLES.
APPLICATION FILED JUNE 27, 1908.
1,006,350.
Patented Oct. 17, 1911.
2 SHEETS—SHEET 1.
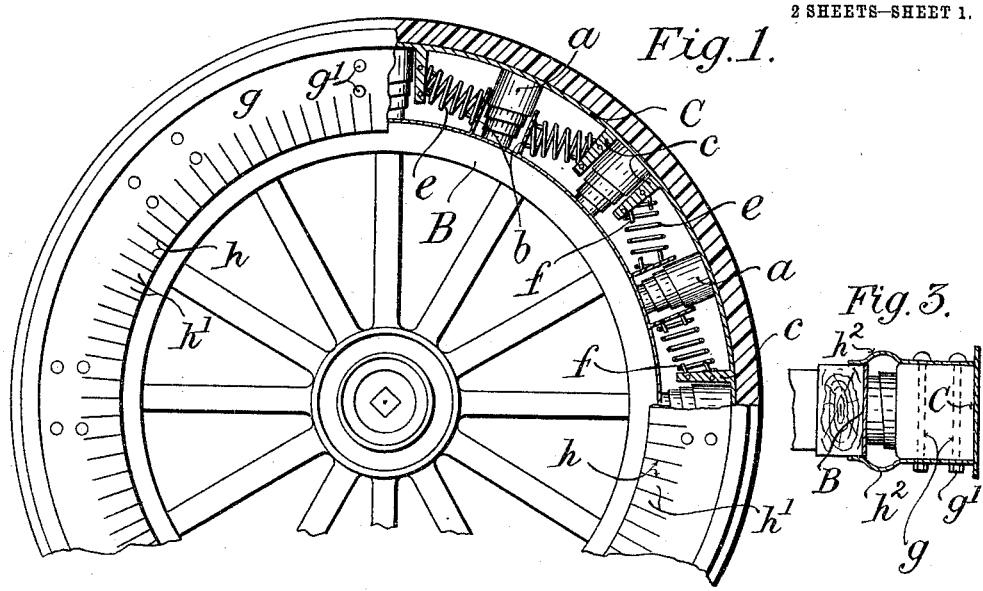
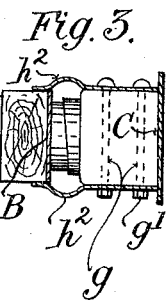
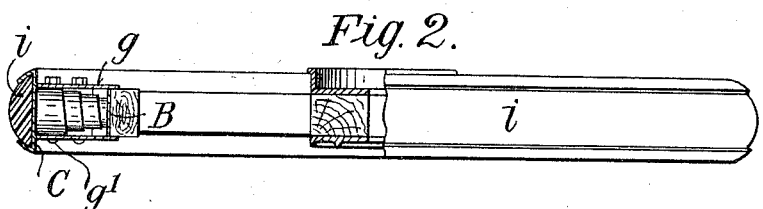
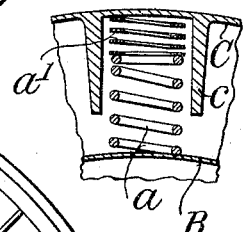
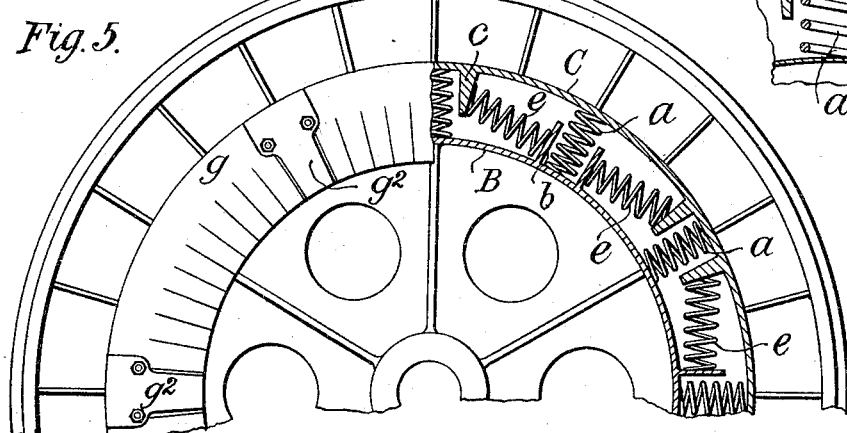
WITNESSES:
INVENTOR:
George Bird,
By Attorneys, G. BIRD.
SPRING WHEEL FOR ROAD VEHICLES.
APPLICATION FILED JUNE 27, 1908.
1,006,350.
Patented Oct. 17, 1911.
2 SHEETS—SHEET 2.
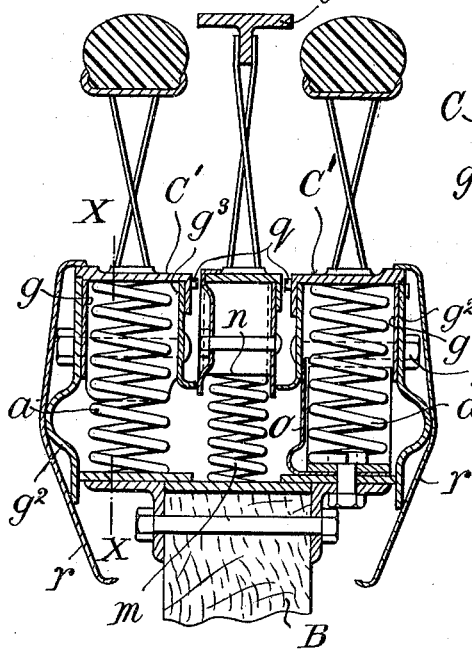
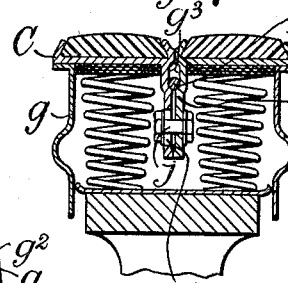
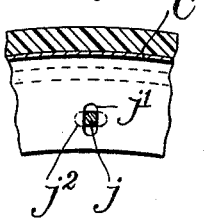
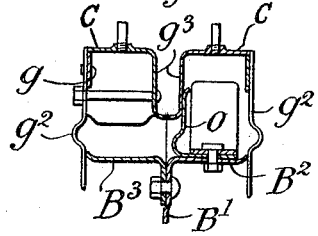
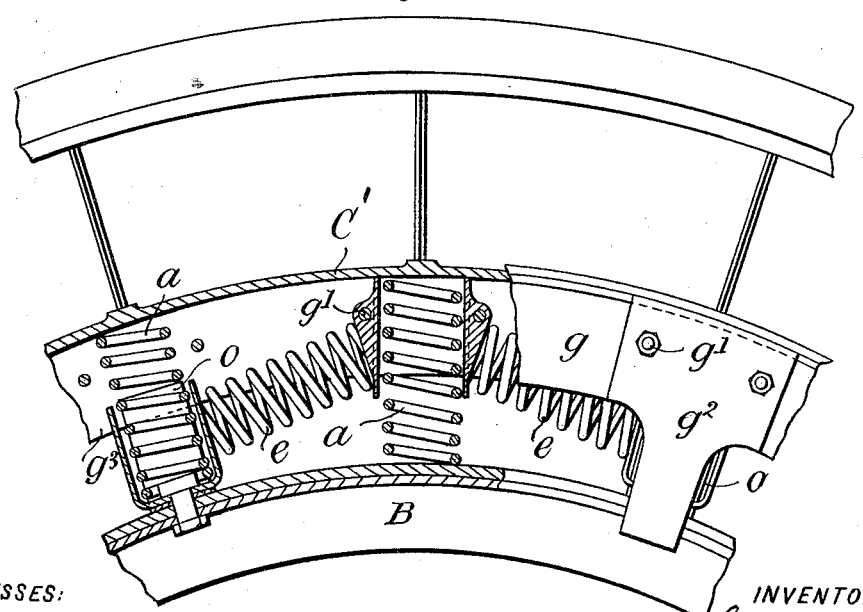
WITNESSES:
INVENTOR:
George Bird,
By his Attorneys

UNITED STATES PATENT OFFICE.

GEORGE BIRD, OF EARLEY, NEAR READING, ENGLAND.

SPRING-WHEEL FOR ROAD-VEHICLES.

1,006,350.  Specification of Letters Patent.  Patented Oct. 17, 1911.

Application filed June 27, 1908. Serial No. 440,724.

*To all whom it may concern:*

Be it known that I, GEORGE BIRD, of the Shrublands, Earley, near Reading, Berkshire, England, engineer, have invented certain new and useful Improvements in Spring-Wheels for Road-Vehicles, of which the following is a specification.

This invention relates to spring wheels of the type wherein the relatively moving hub and rim members are coupled together by coiled springs, some situated on axes disposed radially, and others on axes disposed circumferentially, tangentially or at a suitable inclination with the circumferential line, hereinafter referred to as circumferential springs, and the object of the invention is to provide an improved construction of this type of spring wheel.

The improved spring wheel consists of the combination of a hub member and a rim member disposed with an annular space between them, a series of radial and circumferential springs all working under compression, abutments for receiving the thrust of the springs on the rim member and abutments for receiving the thrust of the springs on the hub member, said abutments being arranged alternately on the hub and rim members whereby the circumferentially disposed springs take the torsional or driving stresses under compression in both directions of rotation and the radial springs take the weight of the vehicle under compression, means being provided for holding one end of each radial spring in fixed relation to one of the wheel members while allowing the other end to slide freely upon the other wheel member, said radial springs being in some cases formed of two coiled members in alinement, one spring serving to take the weight and the other to follow the movement of the hub and rim members.

Two or more rim members and an accompanying set of springs may be mounted on one hub member in such manner that each rim member will be capable of independent resilient action the hub member may also be duplicated if required. The lateral stability of the wheel is maintained by a series of oppositely acting springs or spring plates and suitable side plates or shrouds are provided where required to inclose the springs and said side plates in some cases serving to assist in maintaining the lateral stability of the wheel.

The accompanying drawings illustrate several forms of spring wheel made in accordance with this invention.

Figure 1 is a part sectional side elevation. Fig. 2 is a part sectional plan of Fig. 1. Fig. 3 is a part transverse section of a wheel showing a slight modification of Figs. 1 and 2. Fig. 4 is a similar view to Fig. 3 showing a modification. Figs. 5 and 6 are similar views to Figs. 1 and 2 showing a modified construction of a wheel with two treads or tire members and one rim member. Figs. 7 and 8 illustrate in cross section details of construction in a two-rim wheel. Fig. 9 is a part cross section showing a wheel similar to that shown in Figs. 5 and 6 provided with a third or intermediate rim member. Fig. 10 is a part section on line $x$—$x$ of Fig. 9. Fig. 11 illustrates in cross-section a further modified construction.

In the form shown in Figs. 1 to 3 the radial springs $a$ $a$ in the form of tapered cylindrical spirals, are mounted between pairs of transverse plates or brackets $b$ and $c$ respectively which may be said to form sockets, disposed alternately on the hub member B and on the inner surface of an annular plate or ring C which forms or carries the tire and may be referred to as the rim member. The said transverse plates $b$ $c$ project for a suitable distance across the space between the rim member C and hub member B leaving sufficient room for the movement of the said rim and hub members under the resiliency of the radial springs $a$ which are seated in and project from the alternately disposed sockets, the free ends of the springs have freedom to slide circumferentially upon the member C or B against which they abut. The said transverse plates $b$ $c$ form abutments for receiving the thrust of the circumferentially disposed springs $e$ each of which are in compression between a plate $c$ on the rim member and an adjacent plate $b$ on the hub member B. Suitable projections such as $f$ may be provided on the plates $b$ $c$ to pass inside the coil of the springs and keep them in place. It is obvious that helical springs could be used in lieu of spiral springs.

In some cases the radial springs may be formed in two or more parts which may be in alinement, a strong part to take the weight and a weak part to enable these springs without undue stress to continuously fill the annular space between the hub and rim members, which space at times increases at the top of the wheel owing to the eccentricity of axle and outer rim member due to the weight of the car and shocks to the outer rim. The initial grip between the respective rim and hub member depends on the strength of the weaker spring and this arrangement gives freedom of action to the circumferentially disposed or driving springs by allowing the free ends of the radial springs to slide on their respective seatings without undue friction. Fig. 4 shows one such construction wherein the spring $a$ for taking the weight of the vehicle is of substantial section while the weak spring $a'$ is composed of thin flat coiled steel, the flat surface being transverse to the axis of the spring.

When desired a thin band of rubber can be mounted on the outer tire for the purpose of reducing the noise, as shown at $i$ Fig. 2.

It is obvious that where special resiliency is required, the hereindescribed means of isolating the axle from road shocks can be used in conjunction with pneumatic tires in lieu of the rubber band described.

In modified constructions illustrated in Figs. 5 to 11 the wheel is shown as formed with two or more separate annular members forming rim members arranged side by side and each supported by a separate series of radial and circumferential springs from one hub member. Each rim member will have a certain amount of independent radial and circular movement limited by the compression of the several springs and the range allowed by the devices which couple them together.

Fig. 11 shows the invention applied to a wheel with two rim members having independent movement in regard to the hub member. The construction shown is such as to enable one of the tire members together with the springs and other parts to be removed intact if required. The hub member B is formed of a disk B' which can be bolted to any suitable wheel hub and said disk is provided at its outer edge on one side with a flange $B^2$ while another flange $B^3$ is bolted to the opposite side of the disk B', the two flanges forming an outer rim of sufficient width to carry the two rim members C. It will be seen that by simply unbolting the flange $B^3$ the center left hand tire tread can be removed without in any way interfering with the springs and other parts thereof. The separate rim members C C are provided with inwardly extending flanges $g^3$ $g^3$ the inner circumference of which in regard to the felly will be such as to allow of the required radial movement.

Another construction of wheel having two treads is illustrated in Figs. 7 and 8. The two separate rim members C C have their inwardly extending flanges $g^3$ $g^3$ fastened together by bolts $j$ working in slots, the slots $j'$ in one member being placed at right angles with the slots $j^2$ in the outer member, whereby the relative movement of the treads will be allowed for by the movement of the bolts in the slots.

Figs. 9, and 10 show a construction of wheel having three treads wherein additional means are provided for preventing or minimizing side slip. Between the two outer treads or tires I dispose another and intermediate rim or tire member $l$ supported from the hub member by radial springs $m$ carried in suitable pockets formed by plates $n$ on the said rim or tire member, the action of this intermediate member is such that when the outer tires are being driven by the circumferential springs $e$ the said central member being unprovided with driving springs and lugs will trail or lag, but when side slip occurs or tends to occur, the central member will engage the road surface and prevent or minimize side slip. This central member may be provided with a resilient tread surface or not as required. Suitable lugs or projections $q$ are provided on the inner flanges $g^3$ $g^3$ and on the adjacent flanges of the tire $l$ which limit the free circumferential movement of the intermediate member $l$ in relation to the outer rim members C' C' to half a revolution. The object of this is to convey the brake effort applied in the usual manner to the outer members through these lugs to retard the intermediate member.

The lateral stability of the improved wheel is preferably secured by the use of spring plates such as $o$ shown in Figs. 9, 10, and 11, said spring plates are attached to the hub member and engage or press against the inner surfaces of the sides of the rim member, being thereby more efficiently lubricated than if placed externally. In Fig. 11 the said spring plates $o$ are placed on the rim member in such manner that one series thereof engage and press on one rim member in one direction, and the other alternately disposed series of spring plates engage and press upon the other rim member in the opposite direction thus keeping the two members of the wheel together, the side plates $g$ only extend inward from the rim member a short distance. The spring plates $o$ are shown as attached to the hub member by a part $B^2$ at right angles clamped between said hub member and the base of the socket pieces $b$. If required the side plates $g$ may also be employed to maintain the lateral stability as is shown in some of the other figures, for instance, as shown in Figs. 1 to 7 where the said side plates pass over and embrace the hub member so as to have free radial and circumferential sliding movement thereon under the resiliency of the springs, and to insure resiliency the said side plates are provided with a series of radial slots $h$ on the inner circumference which provides a corresponding number of tongues $h'$ rooted outward and with free ends pointing toward the center. By making such side plates of steel or other flexible material any side blow on the tire will be absorbed by the resiliency due to the tongues and will tend to deflect them in a direction parallel to the axis of the wheel causing the opening formed by the points of the tongues to assume a larger diameter which being unconnected they would be at liberty to do, on the weight of the blow ceasing the spring like tongues would recover their normal position. The said tongues $h'$ may, if required, be curved or dished as at $h^2$ to make the tongued parts more resilient as shown in Fig. 3. Further, as shown on the left hand portion of Fig. 5, the side plate $g$ may be provided with supplementary flat springs such as $g^2$ somewhat similar to the spring plates $o$ but outside. The springs $g^2$ are secured by bolts or otherwise at suitable distances apart so as to increase the strength thereof. In some cases as shown in Figs. 9 10 and 11 the side plates $g$ will not be extended over the rim B but will be only of such depth as to form a seating for the spring arms $g^2$ which in this case would take all the lateral strains, a light metal shrouding such as $r$ similar to that shown in Fig. 9 being employed for protecting the spring chamber from dust and wet.

What I claim and desire to secure by Letters Patent is:—

1. In a spring wheel, the combination of a hub member and a rim member disposed with an annular space between them, a series of radial springs working in compression, a series of circumferentially-disposed springs working in compression, and sockets enveloping the radial springs for a considerable part of their length, said sockets being alternately disposed on the hub and rim members, and forming abutments for receiving the thrust of the circumferentially-disposed springs which act in compression between the adjacent sides of the pockets, said radial springs being free at one end to slide with relation to the member against which they abut.

2. In a spring wheel the combination of a hub member and a rim member disposed with an annular space between them, a series of radial springs working in compression, a series of circumferentially-disposed springs working in compression, and sockets enveloping the radial springs for a considerable part of their length, said sockets being alternately disposed on the hub and rim members and alternate sockets having inclined side faces forming abutments for receiving the thrust of the circumferentially-disposed springs which act in compression between the adjacent sides of the pockets, said radial springs being free at one end to slide with relation to the member against which they abut.

3. A spring wheel consisting of the combination of a hub member and a rim member disposed with an annular space between them, a series of radial and circumferential springs all working under compression, abutments for receiving the thrust of the springs on the rim member and abutments for receiving the thrust of the springs on the hub member, said abutments being arranged alternately on the hub and rim members whereby the circumferentially disposed springs take the torsional or driving stresses under compression in both directions of rotation and the radial springs take the weight of the vehicle under compression, means for holding one end of each radial spring in fixed relation to one of the wheel members while allowing the other end to slide freely upon the other member of the wheel, two series of spring plates on one wheel member each series acting in opposite lateral directions upon the other wheel member whereby the lateral stability of the wheel is maintained.

4. A spring wheel consisting of the combination of a hub member, two rim members placed side by side around the circumference of the hub member with an annular space between said rim members and the hub member, a series of radial and circumferential springs between each rim member and the hub member, all said springs working under compression abutments for receiving the thrust of the springs on the rim members and abutments for receiving the thrust of the springs on the hub member, said abutments being arranged alternately on the hub and rim members whereby the circumferentially disposed springs take the torsional or driving stresses under compression in both directions of rotation and the radial springs take the weight of the vehicle under compression, means for holding one end of each radial spring in fixed relation to its abutment while allowing the other end to slide freely upon its abutment.

5. A spring wheel consisting of the combination of a hub member, two rim members placed side by side around the circumference of the hub member with an annular space between said rim members and the hub member, a series of radial and circumferential springs between each rim member and hub member, all said springs working under compression, abutments for receiving the thrust of the springs on the rim members and abutments for receiving the thrust of the springs on the hub member, said abutments being arranged alternately on the hub and rim members whereby the circumferentially disposed springs take the torsional or driving stresses under compression in both directions of rotation and the radial springs take the weight of the vehicle under compression, means for holding one end of each radial spring in fixed relation to its abutment while allowing the other end to slide freely upon its abutment, two series of spring plates disposed on the hub member and pressing the two rim members together whereby the lateral stability of the wheel is maintained.

6. A spring wheel consisting of the combination of a hub member, two rim members placed side by side around the circumference of the hub member with an annular space between said rim members and the hub member, a series of radial and circumferential springs between each rim member and hub member, all said springs working under compression, abutments for receiving the thrust of the springs on the rim members and abutments for receiving the thrust of the springs on the hub member, said abutments being arranged alternately on the hub and rim members whereby the circumferentially disposed springs take the torsional or driving stresses under compression in both directions of rotation and the radial springs take the weight of the vehicle under compression, means for holding one end of each radial spring in fixed relation to its abutment while allowing the other end to slide freely upon its abutment, two series of spring plates disposed on the hub member and pressing the two rim members together whereby the lateral stability of the wheel is maintained, side plates extending from the outer to the inner wheel members and bearing on the said hub member, means for rendering said side plates resilient for the purpose of supplementing the action of the spring plates and thereby adding to the lateral stability of the wheel.

In witness whereof, I have hereunto signed my name in the presence of two subscribing witnesses.

GEORGE BIRD.

Witnesses:
  HENRY ALLEN PRYOR,
  ALFRED B. CAMPBELL.

---

Copies of this patent may be obtained for five cents each, by addressing the "Commissioner of Patents, Washington, D. C."